Nov. 14, 1933.                C. H. WILLIS                1,935,464
                        ELECTRIC VALVE CIRCUITS
                          Filed May 27, 1932
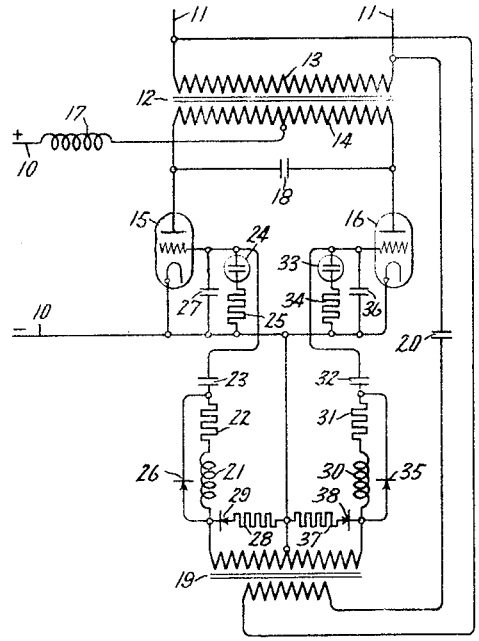
                                              Inventor:
                                           Clodius H. Willis,
                                           by Charles E Mullar
                                             His Attorney.

Patented Nov. 14, 1933

1,935,464

UNITED STATES PATENT OFFICE 1,935,464

ELECTRIC VALVE CIRCUITS

Clodius H. Willis, Princeton, N. J., assignor to General Electric Company, a corporation of New York Application May 27, 1932. Serial No. 613,890

9 Claims. (Cl. 175—363)

My invention relates to electric valve circuits and more particularly to excitation circuits for grid controlled vapor electric valves.

In the use of grid controlled vapor electric valves in electric translating circuits it is customary to determine the instant at which a valve is rendered conductive by impressing a positive potential upon its control grid. This control is often effected cyclically, in cases where the anode-cathode circuit of the valve is included in an alternating or periodic current circuit, by impressing upon the grid an alternating or periodic potential and varying the magnitude or phase relation, or both, of the periodic grid potential. The interruption of the current in valves of this type is usually determined by the external circuit; for example, in many electric translating circuits including vapor electric valves the anode potentials of the valves are periodically depressed below their respective cathode potentials to interrupt the current in the valves. In order for the grid of a valve of this type to maintain control after the anode potential again becomes positive, it is necessary that the valve become substantially completely deionized. Such deionization can be effected by impressing a high negative potential upon the grid of the valve immediately after the anode current has been interrupted therein. The majority of the excitation circuits of the prior art, however, have not been capable of supplying a considerable negative deionization potential without introducing other undesirable characteristics in the excitation circuit.

It is an object of my invention, therefore, to provide an improved excitation circuit for a vapor electric valve which will overcome the above mentioned disadvantages of the arrangements of the prior art and which will be simple and reliable in operation.

It is another object of my invention to provide an improved excitation circuit for an electric valve which will insure a rapid deionization of the valve upon the interruption of the anode current.

It is a further object of my invention to provide an improved excitation circuit for a vapor electric valve which will supply a relatively high negative grid potential immediately after the interruption of the anode current in the valve.

In accordance with one embodiment of my invention, an excitation circuit for a grid controlled vapor electric valve is energized from a source of alternating potential and means for producing a negative bias potential. The phase or the wave shape of the alternating potential is such that the grid is negative for a considerable portion of each interval in which the valve is conductive so that a substantial positive ion current may flow in the grid circuit. An inductance is included in the grid circuit, which upon interruption of the anode current supplies a relatively high voltage which tends to maintain the positive ion current and thus rapidly deionize the valve. In order to prevent this inductance from retarding the building up of the positive grid potential which controls the time of starting of the electric valve, a uni-laterally conductive device, such for example, as a contact rectifier, is connected in parallel to the inductance device with such a polarity as to bypass the normal grid current. In accordance with another feature of my invention the negative bias is produced by a biasing capacitor included in the grid circuit provided with a discharge path including a high resistance and a voltage breakdown device, such for example, as a glow tube. The glow tube is effective to prevent the discharge of the biasing capacitor whenever its terminal potential falls below a predetermined value and thus insures a minimum bias potential.

For a better understanding of my invention, together with other and further objects thereof, reference is had to the following description taken in connection with the accompanying drawing and its scope will be pointed out in the appended claims. The single figure of the accompanying drawing illustrates an arrangement embodying my invention for transmitting energy between a direct-current circuit and a single-phase alternating-current circuit.

Referring more particularly to the drawing, there is illustrated an arrangement embodying my invention for transmitting energy from a direct-current circuit 10 to a single-phase alternating-current circuit 11. This arrangement includes a transformer 12 having a secondary winding 13 connected to the circuit 11 and a primary winding 14 provided with an electrical midpoint connected to the positive side of the direct-current circuit and with end terminals connected to the negative side of the direct-current circuit through electric valves 15 and 16. A current smoothing reactor 17 is preferably included in the direct-current circuit, as illustrated. In case the circuit 11 is not connected to an independent source of electro-motive force for commutating the current between the valves 15 and 16, a commutating capacitor 18 is preferably connected across the winding 14. However, this particular electric translating circuit forms no part of my present invention, but is an arrangement well known in the art. Electric valves 15 and 16 are each provided with an anode, a cathode, and a control grid and are of the vapor electric type in which the starting of current in the valve may be controlled by the potential on the grid, but in which the current in the valve can be interrupted only by means of the external circuit. In order to render the electric valves 15 and 16 successively conductive to transmit alternating current to the circuit 11, their grids are excited from the opposite halves of the secondary winding of the grid transformer 19, the primary winding of which is connected to the circuit 11 through a phase adjusting capacitor 20. The transformer 19 is preferably of the self-saturating type in order to convert the alternating potential supplied by the circuit 11 into one of peaked wave form, an excitation which is particularly suitable for valves of the vapor electric type. However, this feature of exciting the control electrode of an electric valve with an alternating potential of peaked wave form comprises no part of my present invention but is disclosed and broadly claimed in the copending application of B. D. Bedford, Serial No. 485,335, filed September 29, 1930, and assigned to the same assignee as the present application. The grid circuit of the electric valve 15 includes also a reactance device 21, a current limiting resistor 22, and a negative bias capacitor 23. The resistor 22 also serves to prevent oscillations between the reactance device 21 and the capacitor 23. The bias capacitor is supplied with a high resistance leakage path as is well understood by those skilled in the art, comprising a voltage breakdown device, illustrated as a glow lamp 24, a high resistance device 25, the left hand portion of the transformer winding and the reactance device 21 and resistor 22. In order to provide a low impedance path for the normal grid current, the reactance device 21 and resistor 22 are shunted with a uni-laterally conductive device illustrated as a contact rectifier 26. If desired, a capacitor 27 may be connected between the grid and the cathode of the valve 15 to minimize the effect of transient voltages in the anode or grid circuit of this valve upon its control. In case it is desired to bypass the negative half cycles of grid potential from the grid circuit, the left hand portion of the secondary winding of the transformer 19 may be loaded through a resistor 28 and contact rectifier 29. Similarly, the grid circuit of the electric valve 16 includes a reactance device 30, a current limiting resistor 31, and a bias capacitor 32. The capacitor 32 is provided with a high resistance discharge path including a glow lamp 33 and a resistor 34, while the reactance device 30 and resistor 31 are by-passed with a contact rectifier 35, as in the grid circuit of the valve 15. Similarly, the right hand portion of the transformer winding is loaded through a resistor 37 and a contact rectifier 38.
However, this feature of loading a grid transformer winding during the negative half cycles of grid potential forms no part of my present invention, but is disclosed and broadly claimed in the copending application of B. D. Bedford, Serial No. 614,134, filed May 27, 1932, and assigned to the same assignee as the present application.

The general principles of operation of the above described translating circuit for transmitting energy from the direct-current circuit 10 to the alternating-current circuit 11 will be well understood by those skilled in the art. In brief, if one of the electric valves, for example, the valve 15, is initially rendered conductive, current will flow through the left hand portion of the winding
14 and generate one-half cycle of alternating current in the circuit 11. During this interval the capacitor 18 will become charged to such a polarity that when, substantially 180 electrical degrees later, electric valve 16 is rendered conductive, the capacitor 18 will be effective to commutate the current from the valve 15 to the valve 16. As current flows through the right hand portion of the winding 14 and the valve 16, a half cycle of alternating current of opposite polarity will be supplied to the circuit 11. In this manner current is successively commutated between the valves 15 and 16 and alternating current is supplied to the circuit 11. The capacitor 20 is effective to secure the proper phase relation between the grid potentials and anode potentials of the valves 15 and 16 so that the current is commutated between them at a point in the cycle when the potential of the capacitor 18 is of the proper polarity to effect the commutation between the valves.

As stated above, the transformer 19 is preferably self-saturating so that the potential appearing in the secondary winding has a peaked wave form. For example, if we consider the short interval during which a positive impulse is supplied by the left hand terminal of the secondary winding of the transformer 19, the grid current will flow from this terminal through the rectifier 26, the capacitor 23, the grid-cathode circuit of the valve 15 back to the midpoint of the transformer winding. This impulse is effective to charge the capacitor 23 with its upper terminal ngative and its lower terminal positive so that, when the positive grid potential supplied by the transformer 19 falls to substantially zero, a value which it maintains during the larger portion of the cycle, the capacitor 23 is effective to supply a negative bias to the grid of the valve 15. When the successive impulses of positive grid current have charged the capacitor 23 to a predetermined potential, the glow tube 24 breaks down and the condenser 23 dissipates its excess charge through the glow lamp 24, resistor 25, the transformer winding, reactance device 21, and resistor 22.
In this manner, the usual high resistance leak across the bias condenser is modified to include a voltage limiting device in order that a predetermined minimum bias potential may be maintained on the capacitor. When the instantaneous potential of the left hand terminal of the transformer winding is less than the bias potential of the capacitor 23, the grid of the valve 15 becomes negative and remains negative as long as the valve 15 is conductive, a period of substantially 180 electrical degrees. Due to its negative charge, the grid of the valve 15 attracts the positive ions of the ionized space of the valve and a "positive ion current" flows in the grid circuit in a direction opposite to that of the normal grid current. However, the positive ion current cannot flow through the rectifier 26 but is confined to the path including the resistor 22 and reactor 21. When the main current has been transferred from the valve 15 to the electric valve 16, the reactance device 21 tends to maintain this flow of positive ion current, but, due to the limited supply of positive ions in the valve 15 after the main current is interrupted, the grid-cathode impedance increases substantially. However, the reactance device 21 supplies the relatively high voltage necessary to maintain the flow of positive ion current until the supply of positive ions is completely exhausted, that is, until the valve 15 is deionized. The constants of the grid circuit should be so chosen that the charge stored on the capacitor 23 during the flow of normal grid current is in excess of that discharged from the capacitor 23 during the flow of positive ion current, so that the capacitor 23 retains a net negative bias to maintain the grid of the valve 15 negative during the complete cycle except for the duration of the positive potential peak supplied by the transformer 19. Obviously the capacitor 32 and the reactance device 30 operate in a similar manner to maintain a negative bias on the grid of the valve 16 and to deionize the valve 16 rapidly upon the interruption of current therein. The loading of the two halves of the secondary winding of the transformer 19 through the resistors 28 and 37 and contact rectifiers 29 and 38 serve to divert the flux from each portion of the winding during the negative half cycles to the other portion of the winding, which is of opposite polarity, and is thus effective to secure the best distribution of the transformer flux. This loading of the transformer winding also tends to prevent the direct-current saturation of any of the transformer circuits and to bypass the high peak of negative potential from the grid circuit, which under certain circumstances, may be undesirable.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In an electric translating circuit, the combination of an intermittently conductive grid controlled vapor electric valve, a grid circuit for said valve including a source of periodic potential and comprising a substantially non-inductive path for the flow of normal grid control current said grid potential being negative during the final portion of the conductive periods of said valve, and means for producing a rapid deionization of said valve comprising an inductive device interposed between said grid and said source and connected to be traversed by the positive ion current to rapidly increase the grid potential negatively upon interruption of current in the valve.

2. In an electric translating circuit, the combination of an intermittently conductive grid controlled vapor electric valve, a grid circuit for said valve including a source of alternating potential and means for producing a negative bias potential, inductive means included in said grid circuit to maintain the positive ion grid current after said valve becomes non-conductive, and uni-laterally conductive means connected in parallel to said inductive means to bypass the normal grid current.

3. In an electric translating circuit, the combination of an intermittently conductive vapor electric valve, a grid circuit for said valve including a source of alternating potential and means for producing a negative bias potential, a reactance device connected in said grid circuit to maintain the positive ion grid current after said valve becomes non-conductive, and a contact rectifier connected in parallel to said reactance device to bypass the normal grid current.

4. In an electric translating circuit, the combination of an intermittently conductive grid controlled vapor electric valve, a grid circuit for said valve including a source of alternating potential and a negative bias condenser, inductive means included in said grid circuit to maintain the positive ion grid current after said valve becomes non-conductive, resistance means included in said grid circuit to prevent oscillations between said condenser and said inductive means, and uni-laterally conductive means connected in parallel to said inductive means to bypass the normal grid current.

5. In an electric translating circuit, the combination of a grid controlled electric valve, a grid circuit for said valve including a source of alternating potential and a negative bias condenser, a high resistance leak for said condenser, and means for preventing the discharge of said condenser whenever its voltage falls below a predetermined value.

6. In an electric translating circuit, the combination of a grid controlled electric valve, a grid circuit for said valve including a source of alternating potential and a negative bias condenser, and a discharge path for said condenser including a serially connected high resistance leak and a voltage breakdown device, whereby the condenser is prevented from discharging whenever its voltage is less than a predetermined value.

7. In an electric translating circuit, the combination of an intermittently conductive grid controlled vapor electric valve, a grid circuit for said valve including a source of alternating potential and a negative bias condenser, a discharge path for said condenser including a serially connected high resistance leak and a voltage breakdown device, inductive means included in said grid circuit to maintain the positive ion grid current after said valve becomes non-conductive, and a uni-laterally conductive device connected in parallel to said inductive means to bypass the normal grid current.

8. In an electric translating circuit, the combination of an intermittently conductive grid controlled vapor electric valve, a grid circuit for said valve including a source of alternating potential, a rectifying device connected across said source to bypass the negative half cycles from said grid circuit, a negative bias condenser included in said grid circuit, a discharge path for said condenser including a serially connected high resistance device and a glow tube, inductive means included in said grid circuit to maintain the positive ion grid current after said valve becomes non-conductive, and a contact rectifier connected in parallel to said inductive means to bypass the normal grid current.

9. In an electric translating circuit, the combination of an intermittently conductive grid controlled vapor electric valve, a grid circuit for said valve including a source of alternating potential and means for producing a negative bias potential, said grid circuit comprising a substantially non-inductive path for the flow of normal grid control current, and an inductance device included in said grid circuit to be traversed by the positive ion current to maintain the positive ion grid current after said valve becomes nonconductive.

CLODIUS H. WILLIS.